United States Patent
Heo et al.

(10) Patent No.: US 10,334,170 B2
(45) Date of Patent: Jun. 25, 2019

(54) CAMERA MODULE

(71) Applicant: SAMSUNG ELECTRO-MECHANICS CO., LTD., Suwon-si (KR)

(72) Inventors: Hoon Heo, Suwon-si (KR); Shin Young Cheong, Suwon-si (KR); Won Seok Bang, Suwon-si (KR); Hee Soo Yoon, Suwon-si (KR); Yong Joon Park, Suwon-si (KR); Won Seob Oh, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 47 days.

(21) Appl. No.: 14/992,248

(22) Filed: Jan. 11, 2016

(65) Prior Publication Data

US 2016/0219222 A1 Jul. 28, 2016

(30) Foreign Application Priority Data

Jan. 23, 2015 (KR) .................. 10-2015-0011504
Apr. 9, 2015 (KR) .................. 10-2015-0050343

(51) Int. Cl.
*H04N 5/232* (2006.01)
*H04N 5/225* (2006.01)

(52) U.S. Cl.
CPC ....... *H04N 5/23287* (2013.01); *H04N 5/2254* (2013.01)

(58) Field of Classification Search
CPC ............. H04N 5/23287; H04N 5/2254; H04N 5/2328; H04N 5/23267; H04N 5/23254; H04N 5/23258
See application file for complete search history.

(56) References Cited

U.S. PATENT DOCUMENTS

| 7,881,598 | B1* | 2/2011 | Wu ................... G03B 3/10 396/133 |
| 2006/0056831 | A1 | 3/2006 | Horio et al. |
| 2006/0104620 | A1* | 5/2006 | Ebato ................ G02B 27/646 396/55 |
| 2007/0154198 | A1* | 7/2007 | Oh ..................... G02B 7/102 396/85 |

(Continued)

FOREIGN PATENT DOCUMENTS

| CN | 104238238 A | 12/2014 |
| JP | 2004-252037 A | 9/2004 |

(Continued)

OTHER PUBLICATIONS

Chinese Office Action dated Jan. 10, 2018 in corresponding Chinese Patent Application No. 201610045889.4. (11 pages in English and 7 pages in Chinese).

*Primary Examiner* — Roberto Velez
*Assistant Examiner* — Tuan H Le
(74) *Attorney, Agent, or Firm* — NSIP Law

(57) ABSTRACT

A camera module includes a lens unit disposed in a housing unit; an actuator unit configured to drive the lens unit in first through third directions relative to the housing unit; and an actuator controller configured to control the actuator unit according to compensation amounts for moving drift in the second and third directions depending on a position of the lens unit in the first direction.

21 Claims, 5 Drawing Sheets

(56) References Cited

U.S. PATENT DOCUMENTS

| | | | |
|---|---|---|---|
| 2009/0180769 A1* | 7/2009 | Mizuta | G03B 17/00 396/55 |
| 2013/0050828 A1* | 2/2013 | Sato | G02B 27/64 359/557 |
| 2014/0049658 A1* | 2/2014 | Yamazaki | H04N 5/23254 348/208.11 |
| 2014/0333785 A1 | 11/2014 | Lee | |
| 2014/0362284 A1 | 12/2014 | Shin et al. | |
| 2016/0327806 A1* | 11/2016 | Kasamatsu | G02B 27/646 |
| 2017/0219914 A1* | 8/2017 | Sekimoto | G02F 1/3501 |

FOREIGN PATENT DOCUMENTS

| | | |
|---|---|---|
| JP | 2006-079007 A | 3/2006 |
| JP | 2013-238822 A | 11/2013 |
| JP | 2014-191017 A | 10/2014 |
| KR | 10-2013-0065603 A | 6/2013 |
| KR | 10-2014-0088310 A | 7/2014 |

* cited by examiner

CAMERA MODULE

CROSS-REFERENCE TO RELATED APPLICATION

This application claims the benefit under 35 USC 119(a) of Korean Patent Application Nos. 10-2015-0011504 filed on Jan. 23, 2015 and 10-2015-0050343 filed on Apr. 9, 2015, in the Korean Intellectual Property Office, the entire disclosures of which are incorporated herein by reference for all purposes.

BACKGROUND

1. Field

The present disclosure relates to a camera module.

2. Description of Related Art

Recently, camera modules have been mounted in mobile devices. A camera module may include a lens unit including a lens barrel, a housing, an actuator, a driver integrated circuit (IC) controlling the actuator, and other components.

The camera module has an auto-focus function. In addition, the camera module may have an optical image stabilization (OIS) function in order to decrease a reduction of resolution caused by shaking of a user's hand when a photograph is taken. The camera module having the above-mentioned functions has a structure in which a lens unit may move in an optical axis direction or a direction perpendicular to an optical axis with respect to a housing of the camera module.

When the actuator is driven in order to move the lens unit in the optical axis direction or a direction perpendicular to the optical axis, it is important that the lens unit is designed to move independently in each direction. However, moving drift, which is a difference in driving characteristics, may occur due to movement of the lens unit.

Since the moving drift may have an influence on image quality and cause screen deterioration, a method of controlling the actuator for preventing such problems is required.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module is capable of compensating for moving drift occurring due to movement of a lens unit. The camera module includes a lens unit disposed in a housing unit; an actuator unit configured to drive the lens unit in first through third directions relative to the housing unit; and an actuator controller configured to control the actuator unit according to compensation amounts for moving drift in the second and third directions depending on a position of the lens unit in the first direction.

In another general aspect, the camera module includes a housing unit comprising a hollow part accommodating a lens unit therein; an actuator unit configured to drive the lens unit in a first direction corresponding to an optical axis direction, a second direction corresponding to a first perpendicular direction of an optical axis, and a third direction corresponding to a second perpendicular direction of the optical axis relative to the housing unit; and an actuator controller configured to control the actuator unit based on compensation amounts for moving drift in the second and third directions corresponding to a position of the lens unit in the first direction.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings is exaggerated for clarity, illustration, and convenience.

DETAILED DESCRIPTION

Figure 1:
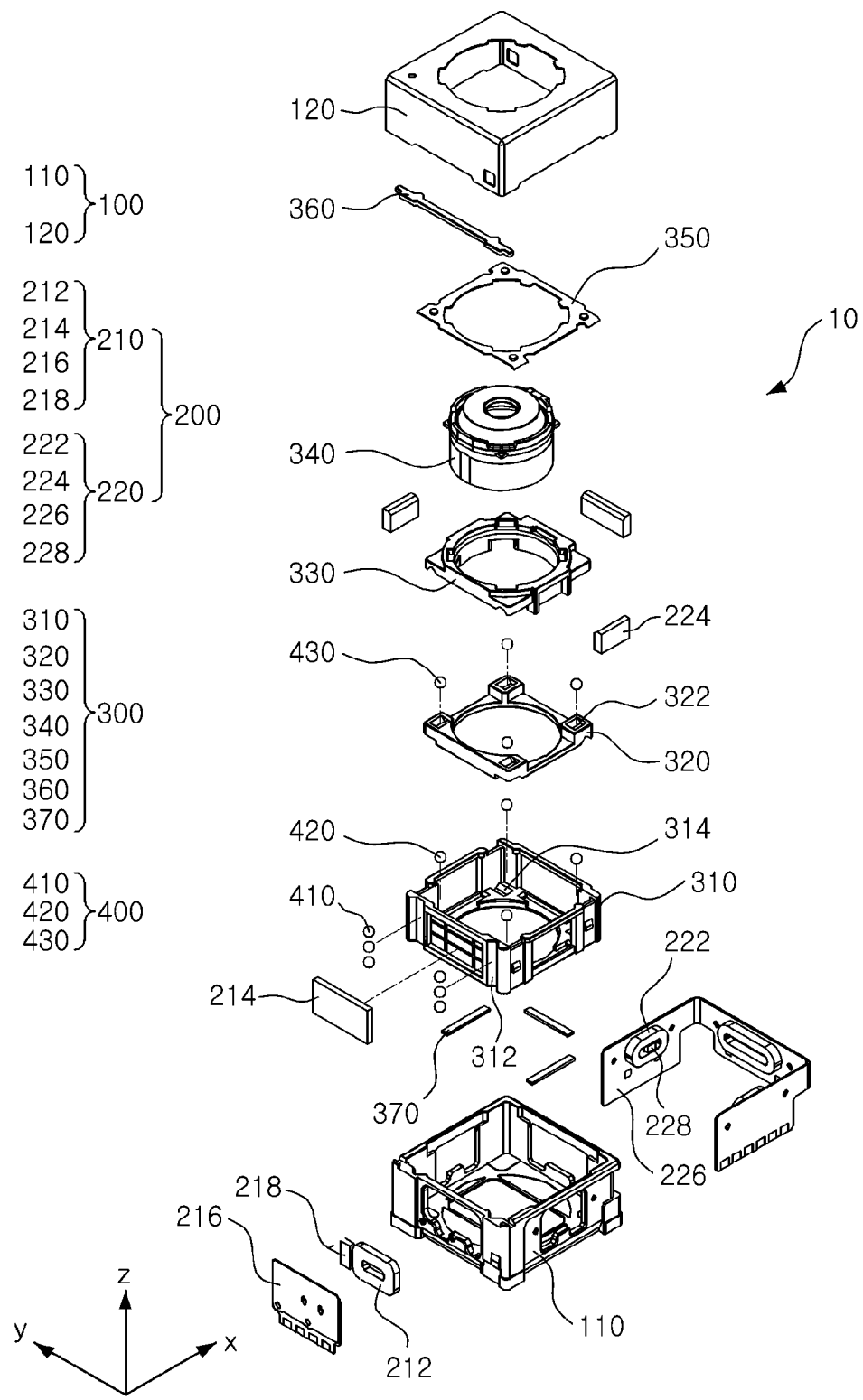
FIG. 1 is an exploded perspective diagram of an example camera module.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but is changed as will be apparent to one of ordinary skill in the art, with the exception of operations necessarily occurring in a certain order. Also, descriptions of functions and constructions that are well known to one of ordinary skill in the art is omitted for increased clarity and conciseness.

The features described herein is embodied in different forms, and are not to be construed as being limited to the examples described herein. Rather, the examples described herein have been provided so that this disclosure will be thorough and complete, and will convey the full scope of the disclosure to one of ordinary skill in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. is used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the embodiments.

Spatially relative terms, such as "above," "upper," "below," and "lower" and the like, is used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device is otherwise oriented (rotated 90 degrees or at other orientations) and the spatially relative descriptors used herein may be interpreted accordingly.

The terminology used herein is for describing particular embodiments only and is not intended to be limiting of the camera module. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the camera module will be described with reference to schematic views illustrating embodiments of the camera module. In the drawings, for example, due to manufacturing techniques and/or tolerances, modifications of the shape shown may be estimated. Thus, embodiments of the camera module should not be construed as being limited to the particular shapes of regions shown herein, for example, to include a change in shape results in manufacturing. The following embodiments may also be constituted by one or a combination thereof.

The camera module according to an embodiment will be described with reference to FIG. 1.

A camera module 10 includes a housing unit 100, an actuator unit 200, and a lens unit 300. The housing unit 100 includes a housing 110 and a shield can 120.

The housing 110 is formed of a material that is easy to shape. For example, the housing 110 is formed of plastic. At least one actuator unit 200 is mounted in the housing 110. For example, a portion of a first actuator 210 is mounted on a first side surface of the housing 110, and a portion of a second actuator 220 is mounted on three side surfaces of the housing 110, for example the second through fourth surfaces of the housing 110. The housing 110 accommodates the lens unit 300 therein. For example, an accommodation space in which the lens unit 300 may be completely or partially accommodated is formed in the housing 110. Six surfaces of the housing 110 have openings. For example, a rectangular hole for an image sensor is formed in a bottom surface of the housing 110, and a square hole for mounting the above-mentioned lens unit 300 is formed in a top surface of the housing 110. In addition, a hole into which a first coil 212 of the first actuator 210 is inserted is formed in the first side surface of the housing 110, and holes into which a second coil 222 of the second actuator 220 is inserted is formed in the second to fourth side surfaces of the housing 110.

The shield can 120 covers a portion of the housing 110. For example, the shield can 120 covers the top surface and four side surfaces of the housing 110. However, a shape of the shield can 120 is not limited to the shape covering all of the above-mentioned portions. For example, the shield can 120 may cover only four side surfaces of the housing 110. Alternatively, the shield can 120 may partially cover the top surface and four side surfaces of the housing 110.

The actuator unit 200 moves the lens unit 300 in at least one direction. For example, the actuator unit 200 may move the lens unit 300 in an optical axis direction (a Z axis direction corresponding to a first direction) and perpendicular directions (an X axis direction and a Y axis direction corresponding to second and third directions) of an optical axis. The actuator unit 200 is configured in two parts. For example, the actuator unit 200 includes the first actuator 210 moving the lens unit 300 in the Z axis direction (see FIG. 1) and the second actuator 220 moving the lens unit 300 in the X axis direction and the Y axis direction (see FIG. 1).

The first actuator 210 is mounted in the housing 110 and a first frame 310 of the lens unit 300. For example, portions of the first actuator 210 is mounted on the first side surface of the housing 110, and the other portion of the first actuator 210 is mounted on a first side surface of the first frame 310. The first actuator 210 includes a configuration for moving the lens unit 300 in the optical axis direction. As an example, the first actuator 210 includes the first coil 212, a first permanent magnet 214, a first substrate 216, and a first sensor 218. The first coil 212 and the first sensor 218 is formed on the first substrate 216. The first substrate 216 is mounted on the first side surface of the housing 110, and the first permanent magnet 214 is mounted on the first side surface of the first frame 310 facing the first substrate 216.

The actuator 210 as described above changes a magnitude and a direction of magnetic force generated between the first coil 212 and the first permanent magnet 214 to enable relative movement of the first frame 310 and a lens barrel 340 with respect to the housing 110. In addition, the first actuator 210 as described above senses a position of the first frame 310 through a change in magnetic flux sensed by the first sensor 218.

The second actuator 220 is mounted in the housing 110 and a third frame 330 of the lens unit 300. For example, portions of the second actuator 220 is mounted on the second to fourth side surfaces of the housing 110, and the other portions of the second actuator 220 is mounted on second to fourth side surfaces of the third frame 330. The second actuator 210 includes a configuration for moving the lens unit 300 in the perpendicular directions of the optical axis. As an example, the second actuator 220 includes a plurality of second coils 222, a plurality of second permanent magnets 224, a second substrate 226, and at least one second sensor 228. The plurality of second coils 222 and at least one second sensor 228 is formed on the second substrate 226. The second substrate 226 is formed in a substantially "C" shape and mounted to enclose the second through fourth side surfaces of the housing 110. The plurality of second permanent magnets 224 are mounted on the second through fourth side surfaces of the third frame 330, respectively, so as to face the second substrate 226.

The second actuator 220 as described above changes a magnitude and a direction of magnetic force generated between the plurality of second coils 222 and the plurality of second permanent magnets 224 to enable relative movement of second and third frames 320 and 330 with respect to the first frame 310. For reference, the lens barrel 340 moves in the same directions as those of the second and third frames 320 and 330 through movement of the second and third frames 320 and 330. The second actuator 220 as described above senses the positions of the second and third frames 320 and 330 by measuring a change in magnetic flux with the second sensor 228.

The lens unit 300 is mounted in the housing unit 100. For example, the lens unit 300 is accommodated in the accommodation space formed by the housing 110 and the shield can 120 so as to move in at least three axis directions. The lens unit 300 is composed of a plurality of frames. For example, the lens unit 300 includes the first frame 310, the second frame 320, and the third frame 330.

The first frame 310 moves with respect to the housing 110. As an example, the first frame 310 moves in a height direction of the housing 110 (the Z axis direction in FIG. 1) by the above-mentioned first actuator 210. A plurality of guide grooves 312 and 314 are formed in the first frame 310. A first guide groove 312 extends in the optical axis direction (the Z axis direction in FIG. 1) in the first side surface of the first frame 310, and second guide grooves 314 extends in a first perpendicular direction (the Y axis direction in FIG. 1) of the optical axis in four corners of an inner bottom surface of the first frame 310, respectively. The first frame 310 is manufactured so that at least three side surfaces thereof are opened, or have openings. For example, the second through fourth side surfaces of the first frame 310 are opened so that the second permanent magnets 224 of the third frame 330 and the second coils 222 of the housing 110 face and interact with each other.

The second frame 320 is mounted in the first frame 310. For example, the second frame 320 is mounted in an internal space of the first frame 310. The second frame 320 moves in the first perpendicular direction of the optical axis with respect to the first frame 310. For example, the second frame 320 moves in the first perpendicular direction (the Y axis direction in FIG. 1) of the optical axis along the second guide grooves 314 of the first frame 310. A plurality of guide grooves 322 are formed in the second frame 320. For example, four third guide grooves 322 extend in a second perpendicular direction (the X axis direction in FIG. 1) of the optical axis in the corners of the second frame 320.

The third frame 330 is mounted in the second frame 320. For example, the third frame 330 is mounted on an upper surface of the second frame 320. The third frame 330 moves in the second perpendicular direction of the optical axis with respect to the second frame 320. For example, the third frame 330 moves in the second perpendicular direction (the X axis direction in FIG. 1) of the optical axis along the third guide grooves 322 of the second frame 320. The plurality of second permanent magnets 224 are mounted on the third frame 330. For example, three second permanent magnets 224 are each mounted on each second through fourth side surface of the third frame 330, respectively. In other words, each of the three surfaces (second surface, third surface and fourth surface) has a permanent magnet 224 attached thereto.

The lens unit 300 includes the lens barrel 340. For example, the lens unit 300 includes a lens barrel 340 including one or more lenses. The lens barrel 340 is mounted in the third frame 330. For example, the lens barrel 340 is inserted into the third frame 330 to thereby move integrally with the third frame 330. The lens barrel 340 is capable of moving in the optical axis direction and the perpendicular directions of the optical axis with the third frame 330. For example, the lens barrel 340 moves in the optical axis direction by the first actuator 210, and moves in the perpendicular directions of the optical axis by the second actuator 220.

Since an air gap between the second permanent magnet 224 of the third frame 330 and the second sensor 228 formed on the second substrate 226 mounted in the housing 110 changes depending on movement of the first frame 310 in the optical axis direction, errors between positions of the second and third frames 320 and 330 sensed by the second sensor 228 and actual positions of the second and third frames 320 and 330 may occur depending on movement of the first frame 310. The error of the positions of the second and third frames 320 and 330 sensed by the second sensor 228 due to movement of the first frame 310 may cause more displacement than desired, resulting in moving drift in the perpendicular directions of the optical axis, attempting to maintain the lens unit 300 to a preset position.

The lens unit 300 further includes a cover member 350, a ball stopper 360, and a magnetic body 370. The cover member 350 prevents the second frame 320 and the third frame 330 from being separated from the internal space of the first frame 310. For example, the cover member 350 is coupled to the first frame 310 to block the second frame 320 and the third frame 330 from being separated upwardly from the first frame 310. The ball stopper 360 is mounted on the first frame 310. For example, the ball stopper 360 is disposed to cover the first guide groove 312 of the first frame 310 to block a first ball member 410 mounted in the first guide groove 312 from being separated.

The magnetic body 370 is mounted on the first frame 310. For example, a magnetic body 370 is mounted on at least one of the second through fourth side surfaces of the first frame 310 to generate attractive force with the second coil 222 and the second permanent magnet 224 of the second actuator 220. The magnetic body 370, as described above, fixes the positions of the second and third frames 320 and 330 with respect to the first frame 310 in an inactivated state of the actuator unit 200. For example, the lens unit 300 is maintained at a predetermined position in the housing 110 by attractive force between the magnetic body 370 and the second coil 222.

A ball member, or bearing assembly, 400 allows the lens unit 300 to move smoothly. For example, the ball member 400 allows the lens unit 300 to move smoothly in the optical axis direction (i.e. along the Z axis) and the perpendicular directions (i.e. along the X and Y axes) of the optical axis. The ball member 400 is includes a first ball member, or bearing, 410, a second ball member, or bearing, 420, and a third ball member, or bearing, 430. As an example, the first ball member 410 is disposed in the first guide groove 312 of the first frame 310 to allow the first frame 310 to move smoothly in the optical axis direction. As another example, the second ball member 420 is disposed in the second guide groove 314 of the first frame 310 to allow the second frame 320 to move smoothly in the first perpendicular direction of the optical axis. As another example, the third ball member 430 is disposed in the third guide groove 322 of the second frame 320 to allow the third frame 330 to move smoothly in the second perpendicular direction of the optical axis. For reference, although not illustrated, a lubricating material for decreasing friction and noise may be provided in all portions in which the ball members 400 are disposed. For example, a viscous fluid may be injected into each of the guide grooves 312, 314, and 322. Grease, as a viscous fluid having excellent viscosity and lubricating properties, may be used.

Figure 2:
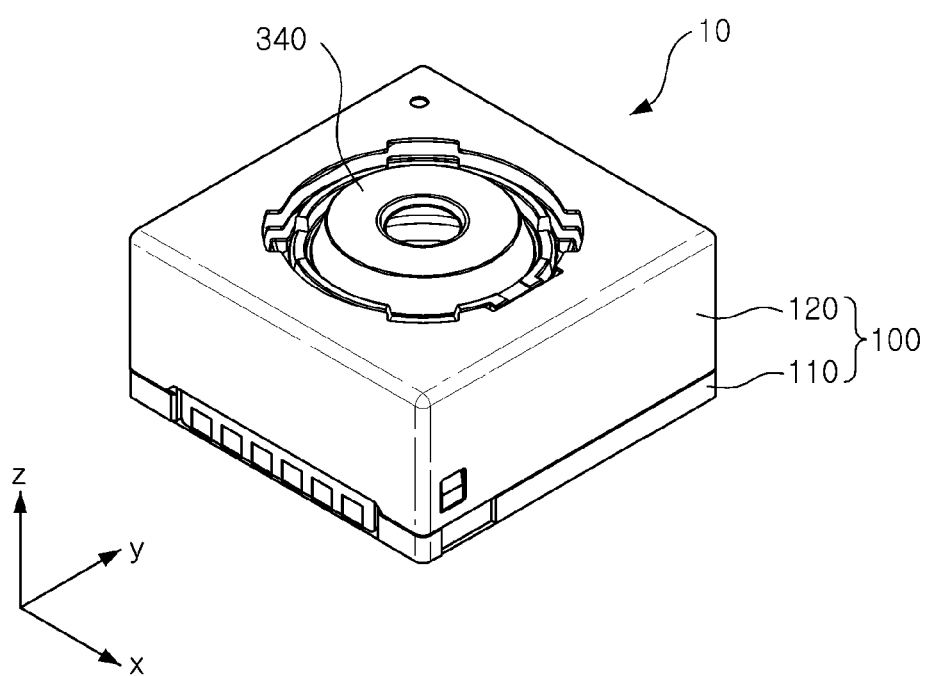
FIG. 2 is an assembled perspective diagram of the camera module of FIG. 1.

FIG. 2 is an assembled perspective diagram of the camera module according to the embodiment illustrated in FIG. 1. The camera module 10 has both an auto-focus function and an optical image stabilization function. For example, the lens barrel 340 moves in the housing unit 100 in the optical axis direction and the perpendicular directions of the optical axis, respectively. Therefore, miniaturization and thinness of the camera module 10 according to the present embodiment is easily achieved.

Although not illustrated in FIG. 2, the camera module includes an actuator controller for controlling the actuator unit 200. The actuator controller is implemented as a portion of a driver integrated circuit (IC) and outputs a control signal for driving the actuator unit 200 according to a command from an application integrated circuit (IC) mounted in an electronic device including the camera module 10.

Further, the driver IC, for example, includes a combination of hardware such as a microprocessor, and software, so as to be mounted in the hardware and operate a predetermined operation. The hardware may include at least one processing unit and a memory. Here, the processing unit may include, for example, a central processing unit (CPU), a microprocessor, an application specific integrated circuit (ASIC), field programmable gate arrays (FPGA), and may have a plurality of cores. The memory may be a volatile memory (such as random access memory (RAM), or the like), a non-volatile memory (such as read only memory (ROM), flash memory, or the like) or a combination thereof.

Figure 3:
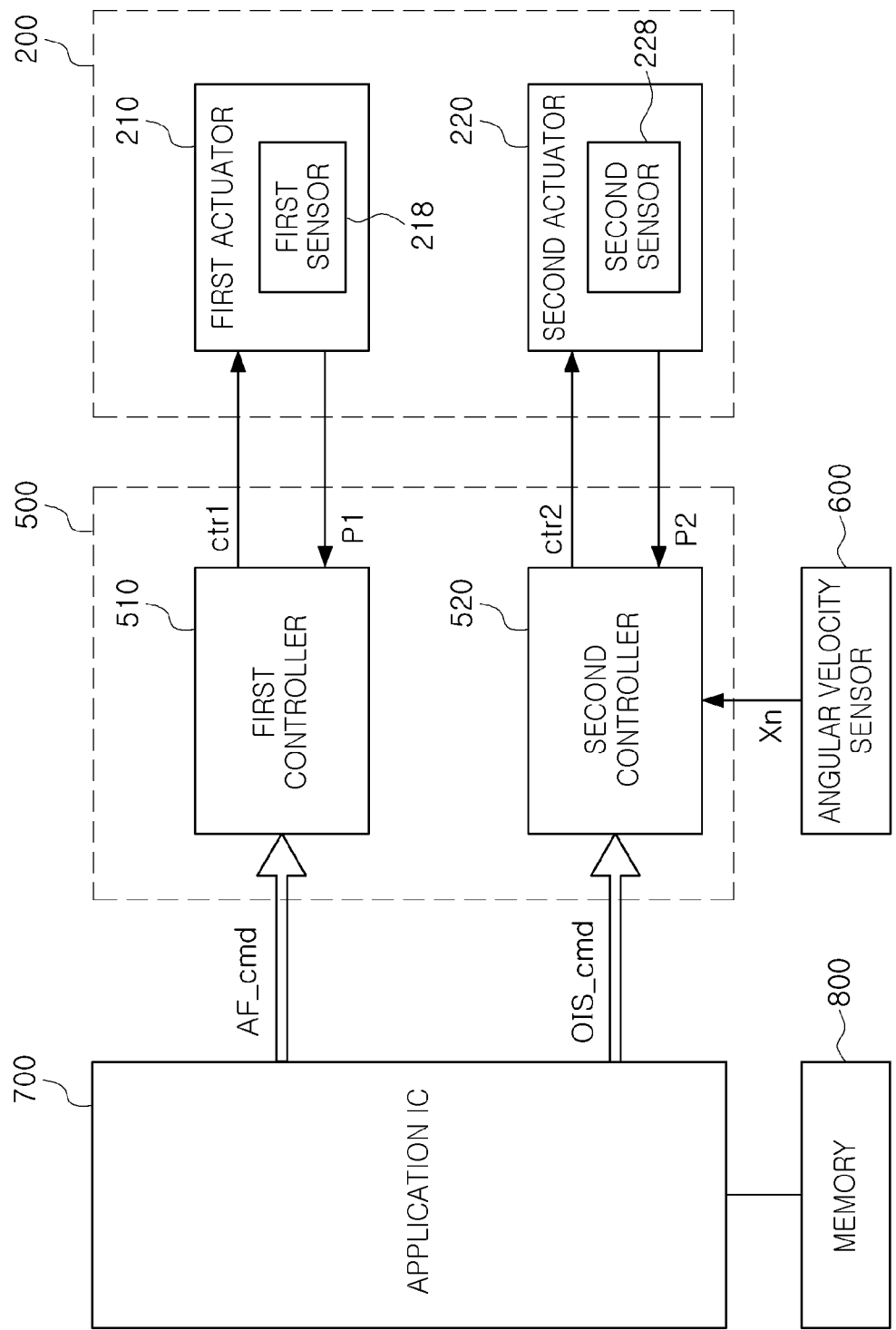
FIG. 3 is a block diagram illustrating the camera module according to an embodiment of the present disclosure.

FIG. 3 is a block diagram illustrating a control scheme for the camera module.

Referring to FIG. 3, the camera includes the lens unit 300 (FIG. 1) mounted in the housing unit 100 (FIG. 1), the actuator unit 200, and an actuator controller 500. The actuator unit 200 drives the lens unit so as to move in first through third directions relative to the housing unit 110. The actuator controller 500 controls the actuator unit 200 based on compensation amounts for moving drift in the second and third directions depending on a position of the lens unit in the first direction. To this end, the actuator controller 500 includes a plurality of operation amplifiers for forming a control signal output to the actuator unit 200. Further, the actuator controller 500 is a part of the driver integrated circuit (IC), wherein the driver IC is implemented, for example, by combination of hardware such as a microprocessor, and software so as to be mounted in the hardware and operate a predetermined operation.

The hardware may include at least one processing unit and a memory. Here, the processing unit may include, for example, a central processing unit (CPU), a microprocessor, an application specific integrated circuit (ASIC), field programmable gate arrays (FPGA), and may have a plurality of cores. The memory may be a volatile memory (such as random access memory (RAM)), a non-volatile memory (such as read only memory (ROM), a flash memory) or any combination thereof.

Further, the actuator controller 500 includes a first controller 510 receiving an auto focus command AF_cmd in order to output a first control signal ctr1 and a second controller 520 receiving an optic image stabilization command OIS_cmd in order to output a second control signal ctr2. AP_cmd includes AF_cmd and OIS_cmd.

The compensation amounts for moving drift is calculated by the application IC 700. The application IC 700 outputs the auto focus command AF_cmd and the optic image stabilization command OIS_cmd to the actuator controller 500. The compensation amounts for moving drift is included in the optic image stabilization command OIS_cmd.

Data for calculating the compensation amounts for moving drift is measured during manufacturing the actuator unit or the camera module, and is stored in a memory 800 connected to the application IC in order to be provided to the application IC 700. As an example, in consideration of a storage capacity of the memory, the data for calculating the compensation amounts for moving drift is obtained by measuring movement displacement of the lens unit in an X axis direction and a Y axis direction (corresponding to the second and third directions) depending on a limited number of positions of the lens unit in a Z axis direction (corresponding to the first direction).

The application IC may calculate the compensation amounts for moving drift using an intermediate value obtained by interpolation or an intermediate value calculated using an equation of an approximated curve.

The following Table 1 illustrates absolute values of movement displacement of lens units in an X axis direction and a Y axis direction depending on three positions of the lens units in a Z axis direction in three camera module samples, respectively.

TABLE 1

| Sample # | Position in Z Axis Direction | Displacement Amount [um] | |
|---|---|---|---|
| | | X Servo On | Y Servo On |
| 13 | 0 | 37 | 60 |
| | 250 | 37 | 60 |
| | 511 | 21 | 60 |
| 31 | 0 | 31 | 65 |
| | 250 | 35 | 62 |
| | 511 | 46 | 66 |
| 33 | 0 | 25 | 71 |
| | 250 | 30 | 71 |
| | 511 | 24 | 66 |

As described above, the actuator unit 200 includes the first actuator 210 moving the lens unit in the Z axis direction depending on the first control signal ctr1 and the second actuator 220 moving the lens unit in the X axis direction and the Y axis direction depending on the second control signal ctr2.

The first actuator 210 includes the first sensor 218 sensing the position of the first frame 310 (FIG. 1), and feedback and transfer first position detection data P1 indicating the position of the first frame to the first controller 510. Further, the second actuator 220 includes the second sensor 228 sensing the positions of the second frame 320 (FIG. 1) and the third frame 330 (FIG. 1), and feedback and transfer second position detection data P2 indicating the positions of the second and third frames to the second controller 520.

Additionally, the second controller 520 receives an angular velocity signal Xn output from an angular velocity sensor 600 for the optical image stabilization function. The angular velocity sensor 600 is a sensor detecting shaking of electronic components including the camera module. A 2-axis or 3-axis (or more) gyro sensor may be used as the angular velocity sensor 600. In addition, the angular velocity sensor 600 serves to detect an angular velocity of movement.

The second controller 520 outputs the second control signal ctr2 for driving the second actuator 220 in order to maintain the lens unit 300 at a predetermined position based on the angular velocity signal Xn and the compensation amounts for moving drift. Therefore, the moving drift occurring due to movement of the lens unit is compensated for.

Figure 4:
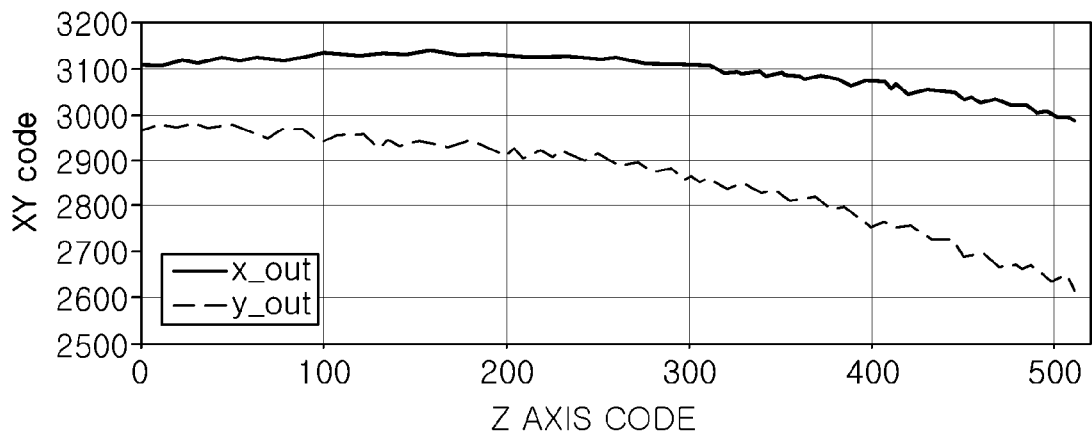
FIG. 4 is a position detection data graph detailing moving drift.

Referring to FIG. 4, the position detection data detected by the second sensor 228 included in the second actuator 220 is confirmed. Position data of the lens unit in the directions (the X axis direction and the Y axis direction in FIG. 1) perpendicular to the optical axis direction, detected by the second sensor 228, changes according to movement of the lens unit 300 in the optical axis direction (the Z axis direction in FIG. 1). This indicates a change in position of the lens unit in the directions (X axis direction and Y axis direction) perpendicular to the optical axis.

Figure 5:
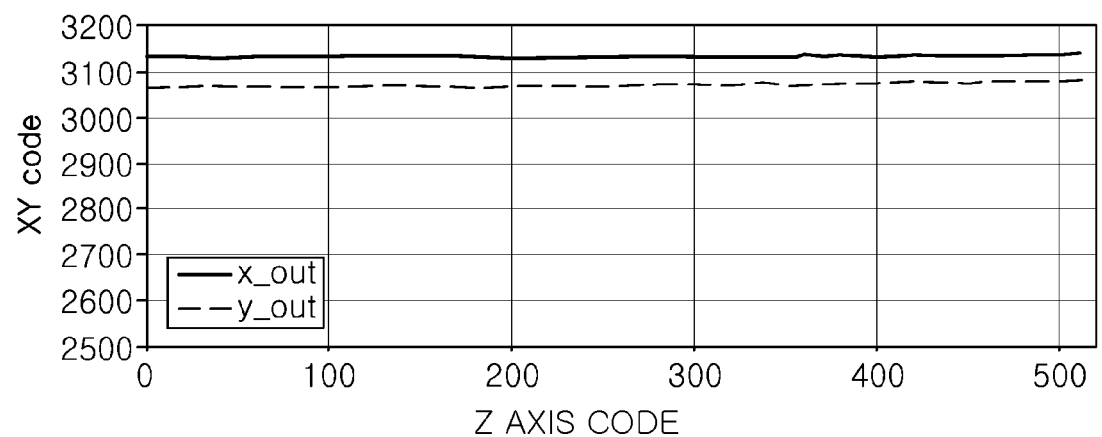
FIG. 5 is a position detection data graph in which a servo control is performed.
Figure 6:
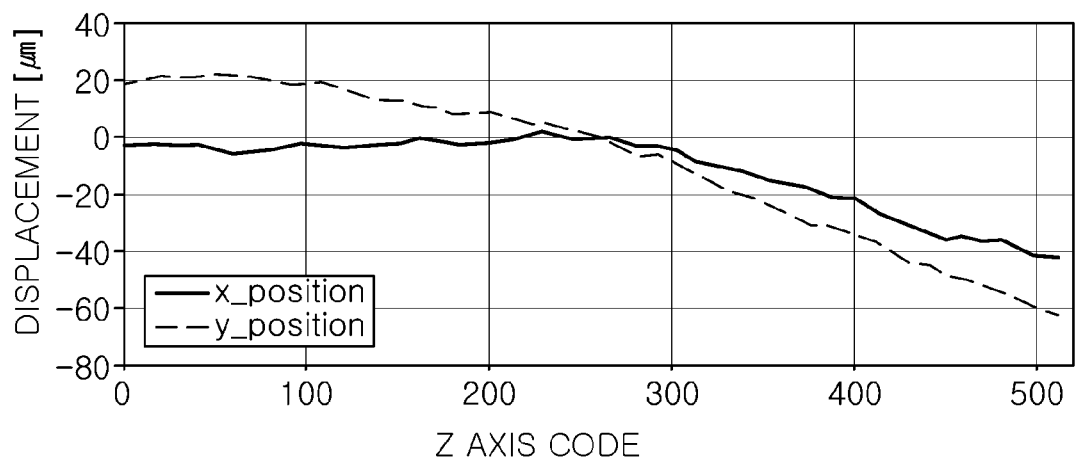
FIG. 6 is a movement displacement graph in which the servo control is performed.

FIG. 5 is a position detection data graph when a servo control is performed, and FIG. 6 is a movement displacement graph when servo control is performed.

Here, the servo control controls movement of the lens unit 300 in the directions (the X axis direction and the Y axis direction in FIG. 1) perpendicular to the optical axis direction so as to maintain current position in the X axis direction and the Y axis direction based on the position detection data detected by sensors.

Referring to FIG. 5 the position detection data in the X axis direction and the Y axis direction are maintained at the preset values by the servo control.

Referring to FIG. 6, movement displacement of the lens unit in the X axis direction and the Y axis direction for maintaining positions of the lens unit in the X axis direction and Y axis direction at the preset values is confirmed. As the lens unit moves in the Z axis direction, position detection data is fed back in a state in which an error is included therein, and thus absolute values of movement displacement (that is, moving drift) in the X axis direction and Y axis direction are increased.

Figure 7:
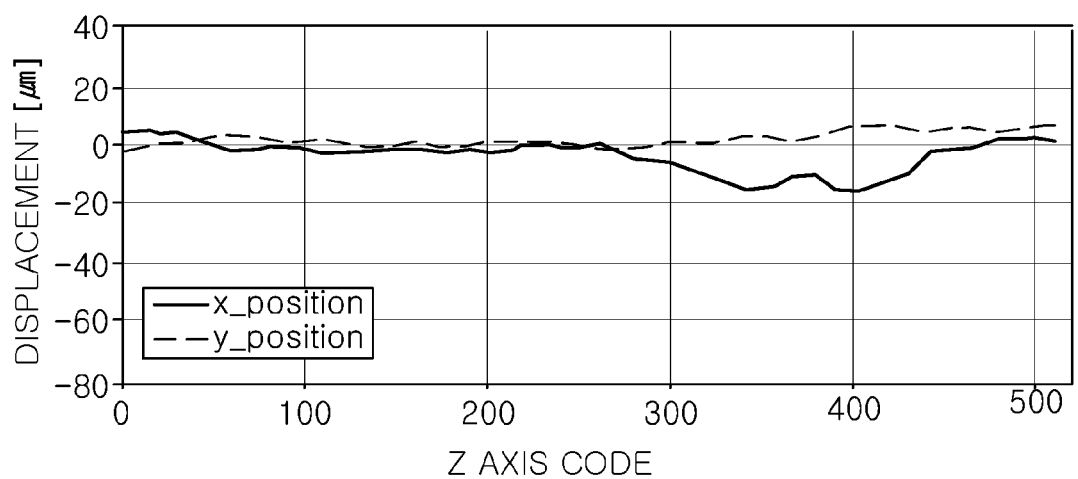
FIG. 7 is a movement displacement graph in which a servo control for compensating for moving drift according to an embodiment of the present disclosure is applied.

Referring to FIG. 7, the moving drift is compensated for, and thus movement displacement in the X axis direction is exhibited within 10 μm, and movement displacement in the Y axis direction is exhibited within 20 μm.

As set forth above, the camera module compensates for the moving drift occurring due to movement of the lens unit.

The apparatuses, units, modules, devices, and other components illustrated in FIGS. 1-3 that perform the operations described herein are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described herein are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

As a non-exhaustive example only, a device as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device capable of wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
   a lens unit disposed in a housing unit;
   an actuator unit configured to drive the lens unit in a first, second, and third direction relative to the housing unit; and
   an actuator controller configured to control the actuator unit according to position detection data indicating positions of the lens unit relative to the housing unit, and according to calculated compensation amounts for compensating moving drift in the second and third directions based on a determined position of the lens unit in the first direction,
   wherein the moving drift is a movement displacement in the second and third directions due to an error included in the position detection data based on a position of the lens unit in the first direction, and
   wherein the calculating of the compensation amounts is based on compensation data predetermined prior to the control of the actuator unit according to the position detection data.

2. The camera module of claim 1, wherein the actuator controller comprises a first controller configured to control movement in the first direction relative to the housing unit according to an auto focus command.

3. The camera module of claim 2, wherein the actuator controller further comprises a second controller configured to control movement in the second and third directions relative to the housing unit according to an optical image stabilization command.

4. The camera module of claim 3, wherein the first controller is configured to receive an auto focus command and first position detection data, and
   the second controller is configured to receive an optic image stabilization command and second position detection data.

5. The camera module of claim 4, wherein the first position detection data and the second position detection data is output from a first sensor and a second sensor, respectively.

6. The camera module of claim 1, wherein the actuator controller comprises a second controller configured to control movement in the second and third directions relative to the housing unit according to an optical image stabilization command.

7. The camera module of claim 6, wherein the second controller is configured to receive an angular velocity signal and calculate the compensation amounts based on the angular velocity signal and moving drift amounts.

8. The camera module of claim 1, wherein the actuator unit comprises a first actuator configured to drive the lens unit in the first direction relative to the housing unit.

9. The camera module of claim 8, wherein the first actuator comprises a first sensor configured to sense the position of the lens unit in the first direction relative to the housing unit.

10. The camera module of claim 1, wherein the actuator unit comprises a second actuator configured to drive the lens unit in the second and third directions relative to the housing unit.

11. The camera module of claim 10, wherein the second actuator includes a second sensor configured to sense positions of the lens unit in the second and third directions relative to the housing unit.

12. The camera module of claim 1, wherein the predetermined compensation data is compensation data prestored in the camera module.

13. A camera module comprising:
    a housing unit comprising a hollow part accommodating a lens unit therein;
    an actuator unit configured to drive the lens unit in a first direction corresponding to an optical axis direction, a second direction corresponding to a first perpendicular direction of an optical axis, and a third direction corresponding to a second perpendicular direction of the optical axis relative to the housing unit; and
    an actuator controller configured to control the actuator unit based on position detection data indicating positions of the lens unit relative to the housing unit, and according to calculated compensation amounts for compensating moving drift in the second and third directions corresponding to a determined position of the lens unit in the first direction,
    wherein the moving drift is a movement displacement in the second and third directions due to an error included in the position detection data based on a position of the lens unit in the first direction, and
    wherein the calculating of the compensation amounts is based on compensation data predetermined prior to the control of the actuator unit according to the position detection data.

14. The camera module of claim 13, wherein the actuator controller comprises a first controller configured to move in the first direction relative to the housing unit according to an auto focus command.

15. The camera module of claim 13, wherein the actuator controller comprises a second controller configured to control movement in the second and third directions relative to the housing unit according to an optical image stabilization command.

16. The camera module of claim 15, wherein the second controller is configured to receive an angular velocity signal and calculate the compensation amounts based on the angular velocity signal and moving drift amounts.

17. The camera module of claim 13, wherein the actuator unit comprises a first actuator configured to drive the lens unit in the first direction relative to the housing unit.

18. The camera module of claim 17, wherein the first actuator comprises a first sensor configured to sense the position of the lens unit in the first direction relative to the housing unit.

19. The camera module of claim 13, wherein the actuator unit comprises a second actuator configured to drive the lens unit in the second and third directions relative to the housing unit.

20. The camera module of claim 19, wherein the second actuator comprises a second sensor configured to sense positions of the lens unit in the second and third directions with respect to the housing unit.

21. The camera module of claim 13, wherein the predetermined compensation data is compensation data prestored in the camera module.

* * * * *